US011900361B2

(12) United States Patent
Taylor et al.

(10) Patent No.: US 11,900,361 B2
(45) Date of Patent: Feb. 13, 2024

(54) RESOURCE PROVIDER ACCOUNT TOKEN PROVISIONING AND PROCESSING

(71) Applicant: VISA INTERNATIONAL SERVICE ASSOCIATION, San Francisco, CA (US)

(72) Inventors: Mary Taylor, San Francisco, CA (US); Laura A. Long, San Mateo, CA (US); Michael Mori, San Mateo, CA (US); Rajat Das, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/953,244

(22) Filed: Sep. 26, 2022

(65) Prior Publication Data

US 2023/0013648 A1   Jan. 19, 2023

Related U.S. Application Data

(62) Division of application No. 15/019,842, filed on Feb. 9, 2016, now Pat. No. 11,501,288.

(51) Int. Cl.
*G06Q 20/36* (2012.01)
*H04L 9/40* (2022.01)

(52) U.S. Cl.
CPC ....... *G06Q 20/367* (2013.01); *H04L 63/0807* (2013.01); *H04L 63/123* (2013.01)

(58) Field of Classification Search
CPC ........... A63F 13/79; G07F 17/32; G06K 7/14; G06Q 20/40; G06Q 20/367; H04L 63/0807; H04L 63/123
See application file for complete search history.

(56) References Cited

U.S. PATENT DOCUMENTS 5,613,012 A   3/1997   Hoffman et al.
5,781,438 A   7/1998   Lee et al.
(Continued)

FOREIGN PATENT DOCUMENTS

EP   2156397 A1   2/2010
WO   0135304 A1   5/2001
(Continued)

OTHER PUBLICATIONS

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
(Continued)

*Primary Examiner* — Patrick McAtee
*Assistant Examiner* — Nakia Leffall-Allen
(74) *Attorney, Agent, or Firm* — Kilpatrick Townsend & Stockton LLP

(57) ABSTRACT

Embodiments are directed to issuing tokens for identifiers associated with a resource provider account specific to the resource provider issuing the account. A resource provider processor system interfaces with a resource provider computer to validate account eligibility upon receiving a token request message. If the account is eligible for token generation, the resource provider processor system generates a universal identifier corresponding to the identifier associated with the resource provider account and returns the universal identifier to the token requestor. The token requestor may send a token request message to a token issuer for obtaining a token using the universal identifier. Accordingly, the universal account identifier can be used to provision a token into a digital wallet. Transactions using the token may be processed with the resource provider processor system acting as an account issuer.

14 Claims, 6 Drawing Sheets

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |

(56) References Cited

U.S. PATENT DOCUMENTS

| | | |
|---|---|---|
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2* | 2/2016 | Anderson ............ G06Q 20/382 |
| 9,280,765 B2 | 3/2016 | Hammad |
| 9,524,501 B2* | 12/2016 | Weber .................... G06Q 20/38 |
| 9,530,137 B2 | 12/2016 | Weiss |
| 9,792,611 B2* | 10/2017 | Hammad ............. G06Q 20/385 |
| 9,846,861 B2* | 12/2017 | Weber .................... H04L 67/02 |
| 9,978,094 B2* | 5/2018 | Gaddam ............ G06Q 30/0637 |
| 10,255,591 B2* | 4/2019 | Makhotin ............. G06Q 20/20 |
| 10,552,834 B2* | 2/2020 | Dimmick ............ G06Q 20/382 |
| 10,878,422 B2* | 12/2020 | Sheets ................ G06Q 20/401 |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1* | 2/2003 | Flitcroft .................. G07F 7/122 705/39 |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0063895 A1* | 3/2010 | Dominguez ........... G06Q 20/40 705/26.1 |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |

(56) References Cited

U.S. PATENT DOCUMENTS

| | | |
|---|---|---|
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0016731 A1* | 1/2012 | Smith .................... G06Q 20/20 705/17 |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0234912 A1* | 9/2012 | Yankovich ............ G06Q 20/36 705/41 |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271697 A1* | 10/2012 | Gilman ................ G06Q 20/387 705/26.35 |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303425 A1* | 11/2012 | Katzin ............... G06Q 20/4016 705/16 |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |

(56) References Cited

U.S. PATENT DOCUMENTS

| | | |
|---|---|---|
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0122331 A1* | 5/2014 | Vaish ................ G06Q 20/3674 |
| | | 705/41 |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0195425 A1* | 7/2014 | Campos ........... G06K 19/06206 |
| | | 705/41 |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1* | 6/2015 | Ngo .................. G06Q 20/3672 |
| | | 705/71 |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0360131 A1* | 12/2015 | Tsuchida ............... A63F 13/216 |
| | | 463/29 |
| 2016/0019536 A1* | 1/2016 | Ortiz ..................... G06Q 20/36 |
| | | 705/67 |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092870 A1* | 3/2016 | Salama .............. G06Q 20/3226 |
| | | 705/44 |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0203352 A1* | 7/2016 | Marsico ............... G06K 7/1417 |
| | | 235/375 |
| 2016/0210628 A1 | 7/2016 | McGuire |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor et al. |

FOREIGN PATENT DOCUMENTS

| | | |
|---|---|---|
| WO | 0135304 A9 | 5/2002 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

U.S. Appl. No. 15/265,282 , "U.S. Patent Application No.", Self-Cleaning Token Valut, Sep. 14, 2016, 52 pages.

U.S. Appl. No. 15/462,658 , "U.S. Patent Application No.", Replacing Token On a Multi-Token User Device, Mar. 17, 2017, 58 pages.

U.S. Appl. No. 61/738,832 , "U.S. Provisional Application No.", Management of Sensitive Data, Dec. 18, 2012, 22 pages.

U.S. Appl. No. 61/751,763 , "U.S. Provisional Application No.", Payments Bridge, Jan. 11, 2013, 64 pages.

U.S. Appl. No. 61/892,407 , "U.S. Provisional Application No.", Issuer Over-the-Air Update Method and System, Oct. 17, 2013, 28 pages.

U.S. Appl. No. 61/894,749 , "U.S. Provisional Application No.", Methods and Systems for Authentication and Issuance of Tokens in a Secure Environment, Oct. 23, 2013, 67 pages.

U.S. Appl. No. 61/926,236 , "U.S. Provisional Application No.", Methods and Systems for Provisioning Mobile Devices With Payment Credentials and Payment Token Identifiers, Jan. 10, 2014, 51 pages.

U.S. Appl. No. 62/000,288 , "U.S. Provisional Application No.", Payment System Canonical Address Format, May 19, 2014, 58 pages.

U.S. Appl. No. 62/003,717 , "U.S. Provisional Application No.", Mobile Merchant Application, May 28, 2014, 58 pages.

U.S. Appl. No. 62/024,426 , "U.S. Provisional Application No.", Secure Transactions Using Mobile Devices, Jul. 14, 2014, 102 pages.

(56) References Cited

OTHER PUBLICATIONS

U.S. Appl. No. 62/037,033 , "U.S. Provisional Application No.", Sharing Payment Token, Aug. 13, 2014, 36 pages.
U.S. Appl. No. 62/038,174 , "U.S. Provisional Application No.", Customized Payment Gateway, Aug. 15, 2014, 42 pages.
U.S. Appl. No. 62/042,050 , "U.S. Provisional Application No.", Payment Device Authentication and Authorization System, Aug. 26, 2014, 120 pages.
U.S. Appl. No. 62/053,736 , "U.S. Provisional Application No.", Completing Transactions Without a User Payment Device, Sep. 22, 2014, 31 pages.
U.S. Appl. No. 62/054,346 , "U.S. Provisional Application No.", Mirrored Token Vault, Sep. 23, 2014, 38 pages.
U.S. Appl. No. 62/103,522 , "U.S. Provisional Application No.", Methods and Systems for Wallet Provider Provisioning, Jan. 14, 2015, 39 pages.
U.S. Appl. No. 62/108,403 , "U.S. Provisional Application No.", Wearables With NFC HCE, Jan. 27, 2015, 32 pages.
U.S. Appl. No. 62/117,291 , "U.S. Provisional Application No.", Token and Cryptogram Using Transaction Specific Information, Feb. 17, 2015, 25 pages.
U.S. Appl. No. 62/128,709 , "U.S. Provisional Application No.", Tokenizing Transaction Amounts, Mar. 5, 2015, 30 pages.
White, "How Computers Work", Que Publishing, 7th Edition, 2003.

\* cited by examiner

RESOURCE PROVIDER ACCOUNT TOKEN PROVISIONING AND PROCESSING

CROSS REFERENCE TO RELATED APPLICATIONS

This application is a divisional application of U.S. application Ser. No. 15/019,842, filed Feb. 9, 2016, which is herein incorporated by reference in its entirety for all purposes.

BACKGROUND

As digital wallets gain increasing popularity and wide spread use, users would like to provision various types of accounts on their digital wallets. For example, users may wish to provision resource provider accounts on their digital wallets. A resource provider account may be an account that is only valid at (e.g. can be used at) the resource provider that created the account. For example, a merchant-specific account is an example of a resource provider account.

However, resource provider accounts (e.g., gift card accounts, prepaid accounts, entity-specific accounts, etc.) are susceptible to being compromised and used fraudulently. This poses a security risk for the resource provider accounts. In addition, the resource provider accounts cannot currently be provisioned into digital wallets.

Embodiments of the present invention solve these problems and other problems, individually and collectively.

BRIEF SUMMARY

Embodiments of the present invention enable issuing a token for a resource provider account specific to (e.g. exclusively valid at) the resource provider issuing the account. A resource provider processor system interfaces with a resource provider computer to validate account eligibility for tokenization upon receiving a token request message from a token requestor. If the account is eligible for token generation (e.g. tokenization), the resource provider processor system generates a universal identifier corresponding to the identifier associated with the resource provider account and returns the universal identifier to the token requestor. The token requestor may send a token request message to a token issuer for obtaining a token using the universal identifier. Accordingly, the universal account identifier can be used to provision a token into a digital wallet. According to various embodiments, one or more limitations may be associated with the resource provider account (e.g. transaction limits or restrictions). In such embodiments, the limitations may be provided to the token issuer to be associated with the generated token. The token may be subject to the same limitations associated with the resource provider account.

Transactions using the token may be processed by the resource provider processor system acting as an account issuer. That is, when a transaction processing system receives a transaction request including the token, the transaction processing system may contact the resource provider processor that issued the universal identifier to process the transaction.

Embodiments provide a method including receiving, by a resource provider processor system, a token request message from a token requestor. The token request message includes a first identifier associated with a resource provider account. The resource provider processor system identifies a resource provider computer associated with the first identifier. The resource provider processor system validates the first identifier with the resource provider computer. In some embodiments, the resource provider processor system may determine that the resource provider account is eligible for tokenization. The resource provider processor system generates a universal identifier associated with the resource provider account, the universal identifier identifying the resource provider account and the resource provider processor system. In some embodiments, a format of the universal identifier is attributed to the resource provider processor system. A format of the first identifier included in the token request message may be different than the format of the universal identifier generated by the resource provider processor system. The method further includes transmitting, by the resource provider processor system, the universal identifier to the token requestor. The token requestor requests a token for the universal identifier from a token issuer server computer. In some embodiments, the token issuer server computer includes a universal account processor server computer. In some embodiments, a mapping between the universal identifier and the first identifier associated with the resource provider account may be stored at a token vault.

In some embodiments, the method may also include determining, by the resource provider processor system, one or more restrictions associated with the resource provider account; and transmitting, by the resource provider processor system, the one or more restrictions to the token issuer server computer such that the token generated by the token issuer server computer is associated with the one or more restrictions. According to various embodiments, the resource provider processor system may contact the resource provider computer to inactivate the first identifier associated with the resource provider account.

In some embodiments, the resource provider processor system may receive identification and verification data associated with account holder of the resource provider account. The resource provider processor system may verify an identity of the account holder using the identification and verification data.

Embodiments may also provide a system including a processor and a computer readable medium coupled to the processor. The computer readable medium comprises code, executable by the processor, to implement the above-described method.

Embodiments further provide a method including receiving, by a token issuer server computer, a token request message including a first identifier from a token requestor. The token issuer server computer determines that the first identifier is associated with a resource provider account. The token issuer server computer transmits a universal identifier request to a resource provider processor system. The universal identifier request includes the first identifier and requests a universal identifier corresponding to the first identifier. The token issuer server computer receives the universal identifier corresponding to the first identifier from the resource provider processor system. The method also includes generating, by the token issuer server computer, a token for the universal identifier. The token represents the universal identifier. The token issuer server computer stores a mapping between the token and the universal identifier at a token vault. The method further includes transmitting, by the token issuer server computer, the token to the token requestor.

In some embodiments, the token issuer server computer includes an universal account processing server computer. In such embodiments, the method further includes receiving, at the universal account processing server computer, a transaction request including the token. The universal account processing server computer retrieves the universal identifier represented by the token from the token vault. The universal account processing server modifies the transaction request to include the universal identifier represented by the token, and transmits the modified transaction request including the universal identifier to the resource provider processor system for processing.

In some embodiments, the token issuer server computer may receive one or more restrictions associated with the resource provider account. The token issuer server computer may store the one or more restrictions along with the generated token at the token vault such that the generated token is subject to the one or more restrictions. In embodiments where the token issuer server computer includes the universal account processing server computer, the universal account processing server computer may determine the one or more restrictions associated with the resource provider account. The universal account processing server computer may apply the restrictions to the resource provider account.

These and other embodiments are described in further detail below.

DETAILED DESCRIPTION

Figure 1:
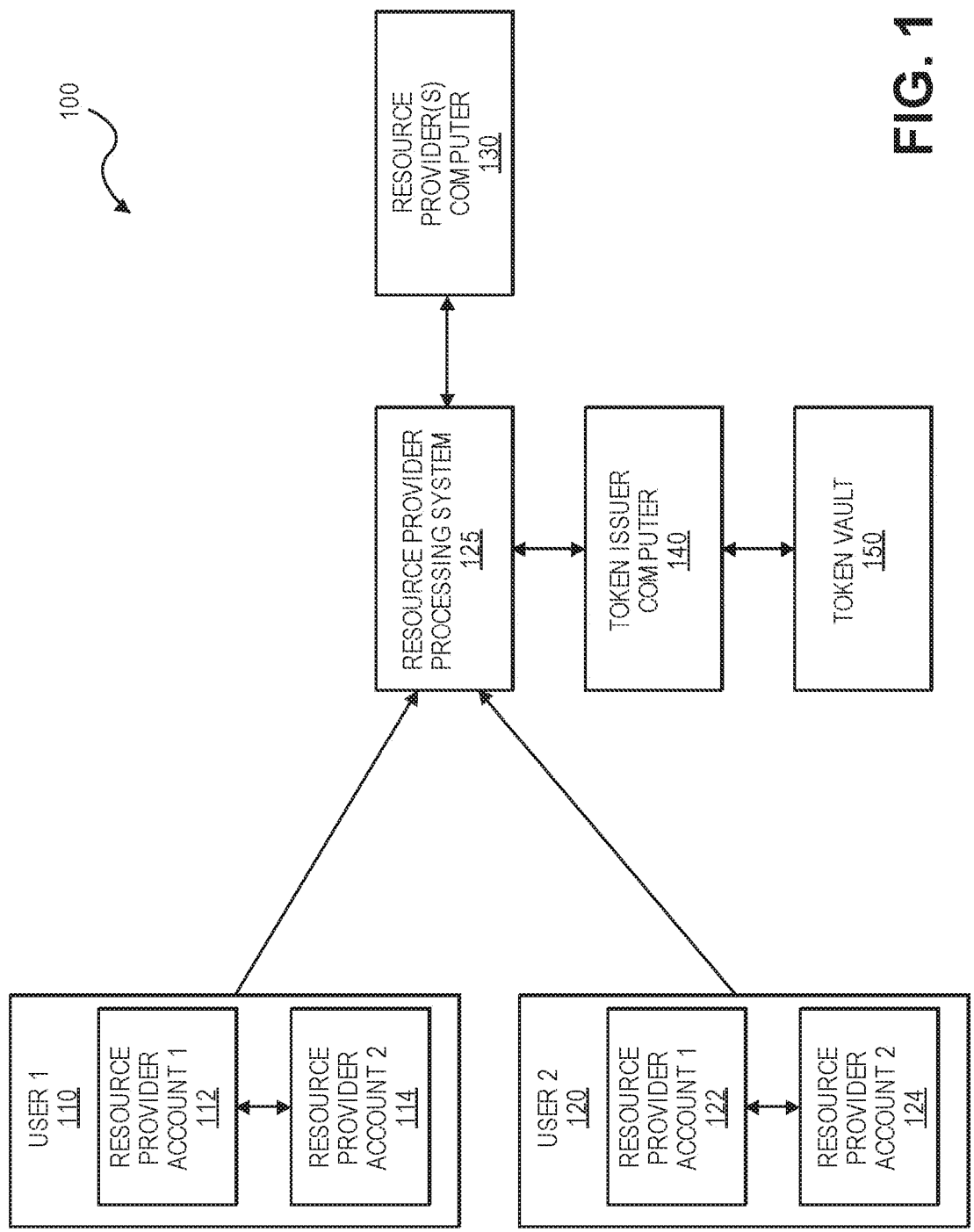
FIG. 1 illustrates a block diagram including a token generation system for resource provider account(s) in accordance with embodiments of the present application.

Embodiments are directed to methods, apparatuses, computer readable media and systems for issuing tokens for identifiers associated with a resource provider-specific account. The resource provider account may be exclusively valid at the resource provider that issued the account. For example, a resource provider account may be a closed-loop account, e.g. a retail store account. Upon receiving a token request message from a token requestor, a resource provider processor system interfaces with a resource provider computer to validate account eligibility for tokenization. If the account is eligible for token generation (e.g. tokenization), the resource provider processor system generates a universal identifier corresponding to the identifier associated with the resource provider account and returns the universal identifier to the token requestor. The token requestor may send a token request message to a token issuer system for obtaining a token using the universal identifier. Accordingly, the universal account identifier can be used to provision a resource provider account into a digital wallet. Transactions using the token may be processed with the resource provider processor system acting as an account issuer. That is, when a transaction processing system receives a transaction request including the token, the transaction processing system may contact the resource provider processor that issued the universal identifier to process the transaction.

According to various embodiments, one or more limitations (e.g. transaction limits or restrictions) may be associated with the resource provider account. In such embodiments, the limitations may be provided to the token issuer to be associated with the generated token. The token may be subject to the same limitations associated with the resource provider account.

In an exemplary embodiment, the resource provider may be a merchant. Accordingly, the resource provider account may be a user account at the merchant. Multiple merchants may work with a processing system (e.g. the resource provider processor system) to process transactions using the merchant accounts. When the user wishes to provision the user's merchant account onto the user's mobile device, the user needs to provide a valid account identifier (e.g. a universal identifier) to a token issuer system. Conventionally, tokens are not issued for merchant-specific accounts, e.g. closed-loop accounts. Thus, the user needs to obtain a valid account identifier (e.g. a universal identifier, an open-loop account identifier) associated with the user's merchant account.

The user may contact the processing system to request a token for the user's merchant account. For example, the user may send a token request message including an account identifier identifying the user's merchant account to the processing system. The processing system may identify the specific merchant based on the format of the account identifier provided in the token request message. The processing system may contact the merchant to ensure that the user's merchant account is eligible for tokenization (e.g. token generation). Upon confirming eligibility, the processing system may generate a universal identifier for the user's merchant account. A format of the universal identifier may indicate that the universal identifier is generated by the processing system as opposed to issuers that conventionally generate the universal identifiers. The processing system may return the universal identifier to the user or may contact a token issuer system to request a token with the universal identifier. If the processing system receives the token from a token issuer on behalf of the user, the processing system provides the token to the user. The user's merchant account may then be provisioned on the user's digital wallet.

Continuing with the foregoing exemplary embodiment, at a later time, the user initiates a transaction using the token associated with the merchant account. When the transaction is initiated using the user's digital wallet, a transaction request message including the token may be sent to a transaction processing system. The transaction processing system may process the transaction request message and identify that the token is associated with a merchant account. The transaction processing system may also identify that the universal account identifier represented by the token is issued by the resource provider processor system. Accordingly, the resource provider processor system may act as an account issuer for the purposes of this transaction. The transaction processing system may interact with the resource provider processor system to process the transaction request initiated using the token.

Before discussing specific embodiments and examples, some descriptions of terms used herein are provided below.

As used herein, a "user device" may comprise any suitable electronic device that may be transported and/or operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, game consoles, etc. Further examples of user devices may also include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem —both devices taken together may be considered a single mobile device).

A "server computer" may typically be a powerful computer or cluster of computers. For example, the server computer can be a large mainframe, a minicomputer cluster, or a group of servers functioning as a unit.

A "user" may include an individual or an entity that uses a system. A user may be associated with one or more accounts and/or user devices. In some cases, the user may also be referred to as an account holder, or consumer.

A "wallet" may refer to a digital wallet or an e-wallet which is a software application that allows an individual to conduct electronic commerce transactions. A digital wallet may store payment credentials, bank account information, one or more digital wallet identifiers and/or the like and can be used in a variety of transactions, such as but not limited to eCommerce, social networks, money transfer/personal payments, mobile commerce, proximity payments, and/or the like for retail purchases, digital goods purchases, utility payments, transferring funds between users, and/or the like. A digital wallet may be designed to streamline the purchase and payment process. A digital wallet may also store transaction records (e.g., electronic receipts).

A "credential" may be any suitable information that serves as reliable evidence of worth, ownership, identity, or authority. A credential may be a string of numbers, letters, or any other suitable characters that may be present or contained in any object or document that can serve as confirmation.

A "resource provider" may be an entity that can provide a resource such as goods, services, information, and/or access. Examples of a resource provider includes merchants, access devices, secure data access points, etc. A merchant may typically be an entity that engages in transactions and can sell goods or services, or provide access to goods or services.

"Account identifier" or "identifier" may include any suitable information associated with an account (e.g. a payment account, a resource access account, etc. and/or a device associated with the account). Such information may be directly related to the account or may be derived from information related to the account. Examples of account information may include an account number (e.g. a primary account number (PAN)), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Account identifiers may include resource provider specific account identifiers or universal identifiers. A resource provider specific account identifier may identify an account issued by a resource provider computer. A universal identifier may identify an account issued by account issuers (e.g. open loop issuers). A universal identifier may have a different format than a resource provider specific account identifier. An issuer of the account may be identified by analyzing the format of the account identifier. In some embodiments, a universal identifier associated with a resource provider specific account may be generated by a resource provider processor system. In such embodiments, the resource provider processor system may act as the issuer for the generated universal identifier.

A "digital wallet" can include an electronic device that allows an individual to conduct electronic commerce transactions. A digital wallet may store user profile information, account credentials, one or more digital wallet identifiers and/or the like and can be used in a variety of transactions, such as but not limited to eCommerce, social networks, money transfer/personal payments, mobile commerce, proximity payments, access transactions, and/or the like. A digital wallet may be designed to streamline the transaction process. A digital wallet may allow the user to load one or more account identifiers onto the digital wallet so as to conduct a transaction without having to enter an account identifier or present a physical identification.

A "digital wallet provider" may include an entity, such as an issuing entity or third party service provider, that issues a digital wallet to a user that enables the user to conduct transactions. A digital wallet provider may provide standalone user-facing software applications that store account numbers, or representations of the account numbers (e.g., tokens), on behalf of an account holder (or other user) to facilitate transactions at more than one unrelated transacting entity, perform person-to-person transactions, or load value into the digital wallet. A digital wallet provider may enable a user to access its account via a personal computer, mobile device or access device.

A "token" may be a substitute value for a credential. A token may be a string of numbers, letters, or any other suitable characters. Examples of tokens include payment tokens, access tokens, personal identification tokens, etc. For example, a payment token may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token provider" or "token service system" can include a system that that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN. In some embodiments, a token service system may include a tokenization computer alone, or in combination with other computers such as a transaction processing system.

A "token request message" may be an electronic message for requesting a token. A token request message may include information usable for identifying an account or digital wallet, and/or information for generating a token. For example, a token request message may include credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, a token request message may be formatted as an authorization request message (e.g., an ISO 8583 message format). In some embodiments, the token request message may include a flag or other indicator specifying that the message is a token request message.

A "token response message" may be a message that responds to a token request. A token response message may include an indication that a token request was approved or denied. A token response message may also include a token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may include a flag or other indicator specifying that the message is a token response message.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of an account to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with an account. An authorization request message may also comprise additional data elements corresponding to "identification information" including, by way of example only: a service code, a CVV (card verification value), a dCVV (dynamic card verification value), an account number, a token, a user name, an expiration date, etc. An authorization request message may also comprise "transaction information," such as any information associated with a current transaction, such as the transaction amount, transacting entity identifier, transacting entity location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an account issuing institution or a transaction processing computer. The authorization response message may include, by way of example only, one or more of the following status indicators: Approval—transaction was approved; Decline—transaction was not approved; or Call Center—response pending more information. The authorization response message may also include an authorization code, which may be a code that an account issuing entity returns in response to an authorization request message in an electronic message (either directly or through the transaction processing computer) to the transacting entity that indicates approval of the transaction. The code may serve as proof of authorization. As noted above, in some embodiments, a transaction processing computer may generate or forward the authorization response message to the transacting entity.

Embodiments enable provisioning a resource provider account on a digital wallet. When the user of the resource provider account wishes to provision the resource provider account on the digital wallet, the digital wallet may send an account identifier to a resource provider processor system to request the provisioning of the account on the digital wallet. The resource provider processor system may analyze the account identifier and identify the resource provider that issued the resource provider account. The resource provider processor system may send a status request message to the resource provider computer to ensure that the resource provider account is eligible for tokenization and/or for being provisioned on user's digital wallet. Based on the response received from the resource provider computer, the resource provider processor system may generate a universal account identifier for the resource provider account. That is, the resource provider processor system may become an issuer or act as a proxy issuer for the universal account identifier. In some embodiments, the resource provider processor system may send the universal account identifier to the user. The user may then request a token from a token issuer computer using the universal account identifier. Alternatively, the resource provider processor system may contact the token issuer computer to request the token for the universal account identifier and may return the token to the user.

FIG. 1 shows a block diagram including a token generation system 100 for resource provider account(s) in accordance with embodiments of the present application. The token generation system includes a resource provider processor system 125, a token issuer computer 140 in communication with a token vault 150, and a resource provider computer 130.

The resource provider processor system 125 may be an entity that processes transactions using account(s) issued by the resource provider(s) computer 130. In some embodiments, the accounts issued by the resource provider computer 130 may be "closed-loop" accounts. A closed-loop account may only be used with the resource provider of that account. For example, an account generated by a specific merchant or service provider may be a closed-loop account where the user may conduct transactions using the account only with the merchant or the service provider.

One or more users 110, 120 may be in communication with the resource provider processor system 125 to request the provisioning of their resource provider account(s) 112, 114, 122, 124 on their user devices. For example, the resource provider processor system 125 may receive an account provisioning request message or a token request message from the user 110 or 120. The account provisioning request message or a token request message may include an account identifier identifying a resource provider account 112, 114 of the user 110 (and/or resource provider account 122, 124 of the user 120).

In some embodiments, the resource provider processor system 125 may also receive identification and verification data from the user 110 or 120. The identification and verification data may be associated with account holder of the resource provider account (e.g. user 110 or 120). The resource provider processor system 125 may verify an identity of the user 110 or 120 using the identification and verification data.

Upon receiving the provisioning request message or a token request message, the resource provider processor system 125 may identify the resource provider computer 130 that issued the resource provider account. The resource provider processor system 125 may contact the resource provider computer 130 to request the status of the resource provider account. For example, if the account is a payment account, the resource provider processor system 125 may request the balance on the payment account. Alternatively, if the account is an access account, the resource provider processor system 125 may ensure that the account is still active or belongs to an active user of the account. Based on the status of the resource provider account, the resource provider processor system 125 may determine that the resource provider account is eligible for tokenization. The resource provider processor system 125 may then generate a universal account identifier identifying the resource provider account.

A universal account identifier may have a different format than the account identifier generated by the resource provider computer 130. For example, the universal account identifier may be globally recognized. An exemplary universal account identifier may be a 16-digit primary account number (PAN) such as 4147 0900 0000 1234. The universal account identifier may be used for processing transactions by entities other than the resource provider computer 130.

In some embodiments, the resource provider processor system 125 may send a token request message including the universal account identifier to the token issuer computer 140. The token issuer computer 140 may generate a token corresponding to the universal account identifier associated with the resource provider account of the user. The token issuer computer 140 may store a mapping between the token and the universal account identifier in the token vault 150. The token issuer computer 140 may return the token to the resource provider processor system 125. The resource provider processor system 125 may send the token to the user device of the user 110, 120.

In other embodiments, the resource provider processor system 125 may send the universal account identifier to the user 110, 120. The user 110, 120 may then send the provisioning request message or the token request message including the universal account identifier to the token issuer computer 140. The token issuer computer 140 may generate a token corresponding to the universal account identifier associated with the resource provider account 112, 114 of the user 110 (or resource provider account 122, 124 of the user 120). The token issuer computer 140 may store a mapping between the token and the universal account identifier in the token vault 150. The token issuer computer 140 may return the token to the user device of the user 110, 120.

Figure 2:
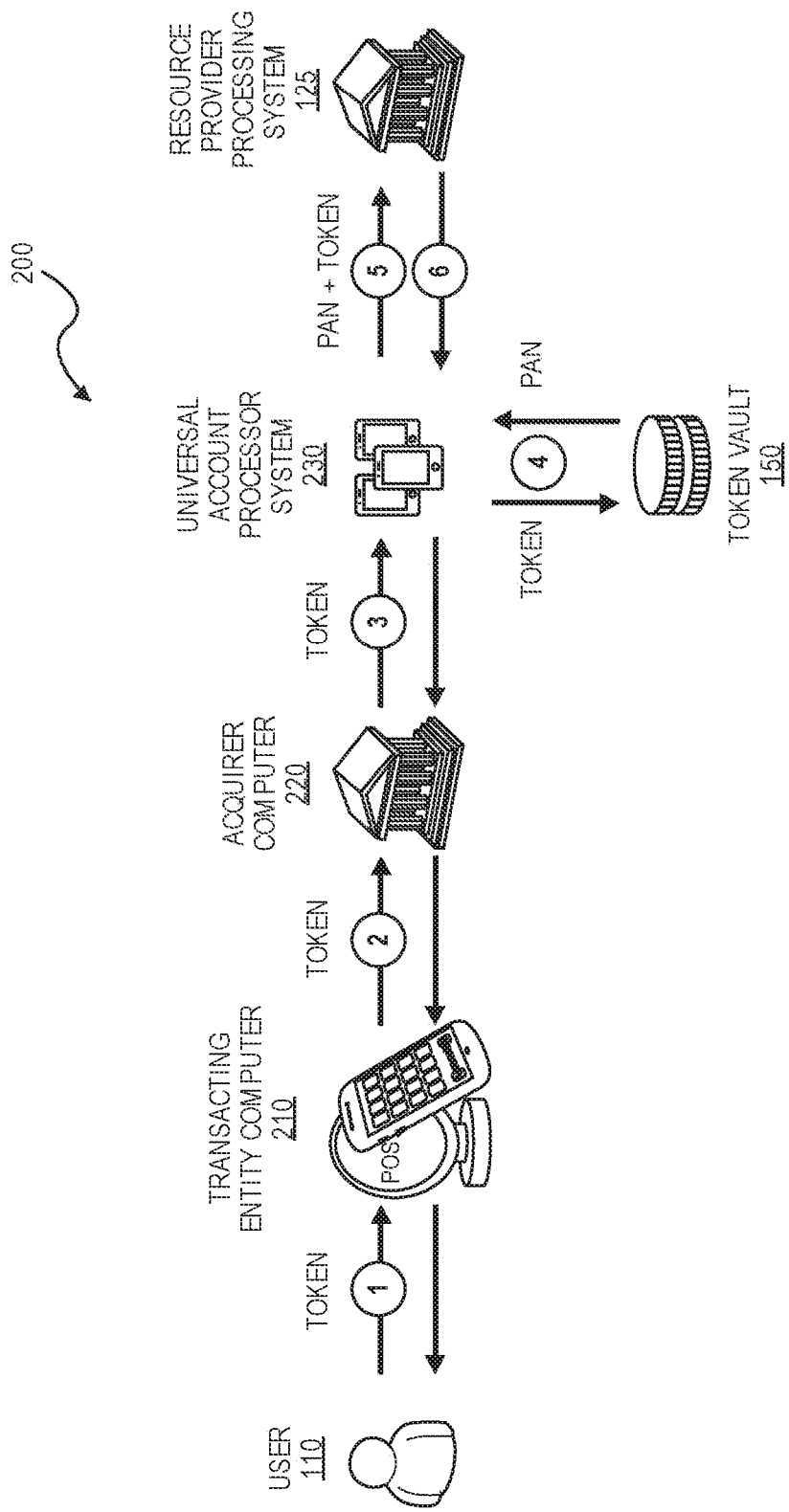
FIG. 2 shows a block diagram of a system for processing a transaction using a token associated with a resource provider account in accordance with embodiments of the present application.

When the token is returned to the user device, the resource provider account may be provisioned on the user device. The user may then initiate a transaction using the token. FIG. 2 shows a block diagram of a system 200 for processing a transaction using a token associated with a resource provider account in accordance with embodiments of the present application. The system 200 includes a user 110, a transacting entity computer 210, an acquirer computer 220, a universal account processor system 230, a resource provider processor system 125, and a token vault 150. An acquirer may operate the acquirer computer 220. An "acquirer" is typically a business entity that has a business relationship with a particular merchant or other entity.

The system 200 comprises a user 110 who may operate a user device. The user 110 may use the user device to conduct a transaction (e.g., a payment transaction) at a transacting entity computer 210. The transacting entity computer 210 may be connected to an acquirer computer 220. The acquirer computer 220 may be connected to the resource provider processor system 125 via the universal account processor system 230. Of course, some or all of these entities depicted as connected may be connected across one or more communication networks or may be directly connected.

A "transacting entity" may typically be an entity that engages in transactions and may sell goods and/or services. A "resource provider" may typically refer to a business entity (e.g., a bank, a merchant, an online portal, an employer, an access control system, etc.) that maintains accounts for users and may issue credentials to be stored on the user device (e.g., a cellular telephone, smart card, tablet, laptop, wearable computing devices, etc.) of the user 110. The user device may interact with the transacting entity computer 210 (e.g., via the Internet to access a website or utilize an application provided by transacting entity computer 210) to initiate and/or conduct a transaction. Each of the entities (e.g., transacting entity computer 210, acquirer computer 220, universal account processor system 230, resource provider processor system 125, and token vault 150) may comprise one or more computer apparatuses to enable communications or to perform one or more of the functions described herein.

The universal account processor system 230 may include data processing subsystems, networks, and operations used to support and deliver certificate authority services, authorization services, exception file services, and clearing and settlement services. An exemplary universal account processor system 230 may include a payment processing network such as VisaNet™. VisaNet™, in particular, includes a VIP system (Visa Integrated Payments system) that processes authorization requests and a Base II system that performs clearing and settlement services. In some embodiments, the universal account processor system 230 may conduct transactions in substantially real-time (e.g., in fewer than a few seconds or fractions of a second). The universal account processor system 230 may include one or more server computers (as described above). The universal account processor system 230 may use any suitable wired or wireless network, including the Internet. In some embodiments, the universal account processor system 230 may be the same as or may be associated with a token issuer system.

In an exemplary purchase transaction, the user 110 purchases a good or service at from a transacting entity using a user device (e.g., a mobile phone). The user device can interact with the transacting entity computer 210. For example, the user 110 may tap the user device against an NFC reader coupled to the transacting entity computer 210 to present the token stored on the user device to the transacting entity computer 210 (step 1). Alternatively, the user 110 may provide credentials to the transacting entity electronically, such using a digital wallet or in through an online transaction.

To cause the transaction to be performed, an authorization request message is generated by the transacting entity computer 210 and is forwarded to the acquirer computer 220 (step 2). Such an "authorization request message" may be an electronic message that is sent to a universal account processor system 230 and/or an resource provider processor system 125 of an account used in the transaction to request authorization for the transaction. An authorization request message, according to some embodiments, may comply with a message type defined by the International Organization for Standardization (ISO) 8583 standard, which is a standard for systems that exchange electronic transaction information associated with payments made by users using a payment account. The authorization request message may include the token provided by the user 110 to the transacting entity computer 210. An authorization request message may also comprise additional data elements corresponding to "identification information" including, by way of example only: a service code, a CVV (card verification value), a dCVV (dynamic card verification value), an expiration date, etc. An authorization request message may also include "transaction information," such as any information associated with a current transaction, such as the transaction amount, transacting entity identifier, transacting entity location, etc., as well as any other information that may be utilized in determining whether to identify and/or authorize a transaction.

After receiving the authorization request message, the acquirer computer 220 will send the authorization request message to the universal account processor system 230 (step 3). The universal account processor system 230 may recognize that the authorization request message includes a token. The universal account processor system 230 may send the token to the token vault 150 for de-tokenization, e.g. to receive a universal account identifier corresponding to the token (step 4). Upon receiving the universal account identifier (e.g. a 16-digit PAN) represented by the token, the universal account processor system 230 may recognize that the universal account identifier is generated by the resource provider processor system 125. For example, the universal account processor system 230 may identify the resource provider processor system 125 based on a format of the universal account identifier, e.g. the universal account identifier may include a symbol or alphanumerical character that is associated with or indicative of the resource provider processor system 125. For example, the universal account identifier may be a 16-digit PAN such as 4147 0900 0000 1234. The first four digits 4147 may identify a specific resource provider processor system 125 that issued this specific PAN.

Upon receiving the universal account identifier from the token vault 150, the universal account processor system 230 may modify the authorization request message to include the universal account number (in addition to or in lieu of the token) and forward the authorization request message to the resource provider processor system 125 (step 5). The universal account number received from the token vault 150 may be used by the universal account processor system 230 to identify the appropriate resource provider processor system 125 for the purpose routing or processing (e.g., determining a risk of the authorization request, which may be based upon known rules of the involved resource provider) the message.

After the resource provider processor system 125 receives the authorization request message, the resource provider processor system 125 sends an authorization response message back to the universal account processor system 230 to indicate whether or not the current transaction is authorized (step 6). An "authorization response message" may be an electronic message reply to an authorization request message generated by the universal account processor system and may comply with the ISO 8583 standard. The authorization response message may include, by way of example only, one or more of the following status indicators: Approval—transaction was approved; Decline—transaction was not approved; or Call Center—response pending more information.

The universal account processor system 230 receives the authorization response message from the resource provider processor system 125 and transmits the authorization response message back to the acquirer computer 220. The acquirer computer 220 then sends the authorization response message back to the transacting entity computer 210, where the transacting entity can determine whether to proceed with the transaction.

If the transaction is a financial transaction, a normal clearing and settlement process can be conducted by the universal account processor system 230 at the end of the day. A clearing process is a process of exchanging financial details between an acquirer and an issuer to facilitate posting to a user's payment account and reconciliation of the user's settlement position. However, it should be noted that embodiments of the invention are not limited to a single settlement process.

Figure 3:
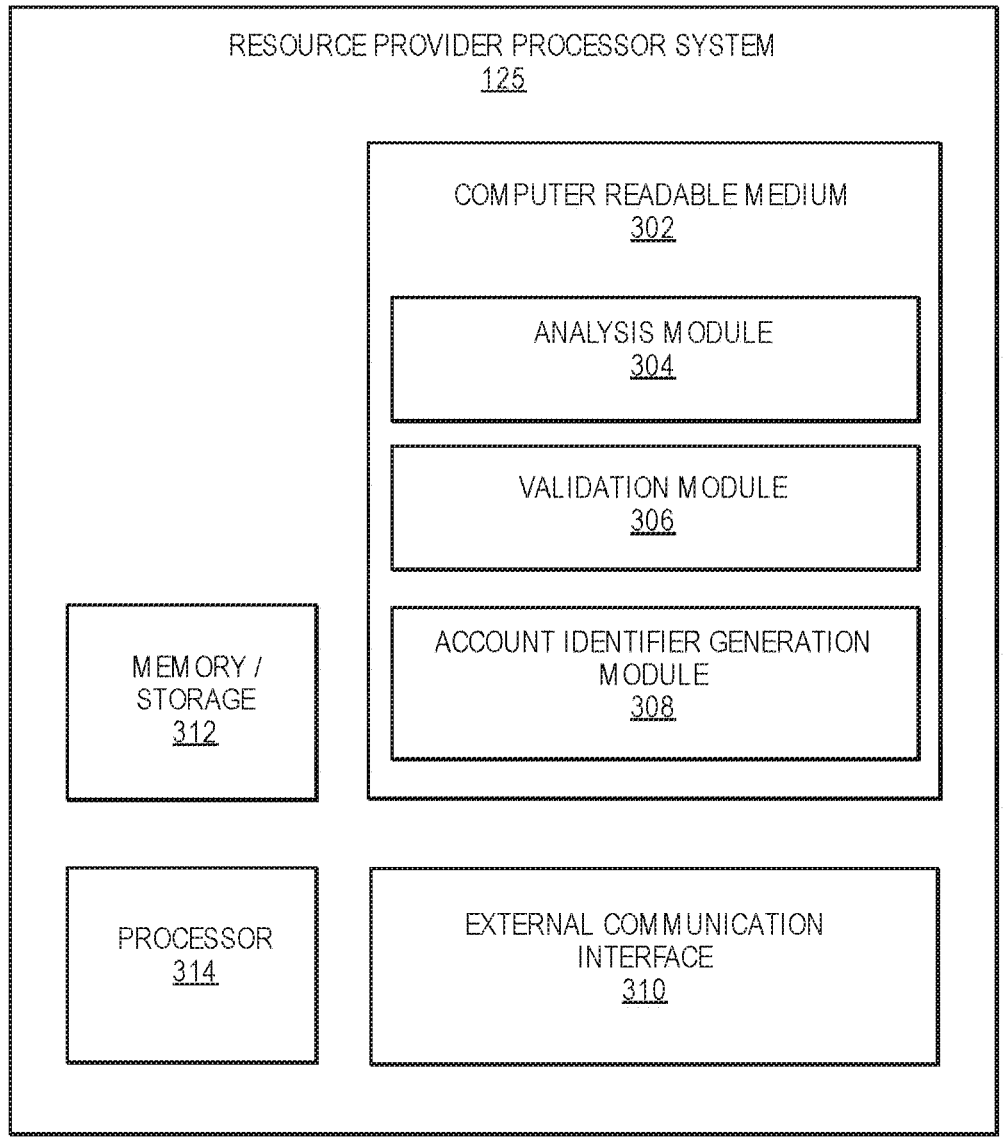
FIG. 3 shows a block diagram of an exemplary resource provider processor system in accordance with some embodiments of the invention.

FIG. 3 shows a block diagram of a resource provider processor system 125 in accordance with embodiments of the present application. The resource provider processor system 125 comprises a processor 314, a memory or storage 312, an external communication interface 310 (e.g. a network interface), and a computer readable medium 302.

The computer readable medium 302 may comprise an analysis module 304, a validation module 306, an account identifier generation module 308, and any other suitable software module(s). The computer readable medium 201 may also comprise code, executable by the processor 314 for implementing a method comprising receiving a token request message from a token requestor, where the token request message includes a first identifier associated with a resource provider account. The method also includes identifying a resource provider computer associated with the first identifier, and validating the first identifier with the resource provider computer. The method further comprises generating a universal identifier associated with the resource provider account, the universal identifier identifying the resource provider account and the resource provider processor system, and transmitting the universal identifier to the token requestor, where the token requestor requests a token for the universal identifier from a token issuer server computer.

The resource provider processor system 125 receives a token request message or a provisioning request message from a user via the external communication interface 310. The message includes an account identifier associated with a resource provider account issued by a resource provider. The analysis module 304 may comprise code that causes the processor 314 to analyze the received account identifier to identify the resource provider that issued (e.g. created) the account identifier and/or the resource provider account identified by the account identifier. In some embodiments, the analysis module 304 may determine the resource provider based on a format of the account identifier. For example, the analysis module 304 may determine that the account identifier is associated with a given resource provider computer if the account identifier starts with (or ends with, contains at a predetermined location, etc.) a specific character.

Upon identifying the resource provider associated with the account identifier, the validation module 306 may send a message to the resource provider computer via the external communication interface 310 to determine whether the resource provider account identified by the account identifier is eligible for tokenization and/or provisioning. In some embodiments, the validation module 306 may determine whether the resource provider account is eligible for tokenization. For example, the resource provider account may be a prepaid account storing value. The validation module 306 may ensure that the account has a positive balance to determine that the account is eligible for tokenization and/or provisioning.

In some embodiments, the token request message or a provisioning request message received from the user may include user identification and verification data such as user name, address, a passcode, etc. The validation module 306 may validate that the user sending the token request message is the authorized user of the resource provider account identified in the token request message.

When the validation module 306 determines that the resource provider account is a valid account, the validation module 306 may inform the account identifier generation module 308. The account identifier generation module 308 may generate a universal account identifier for the resource provider account. The universal account identifier may identify the resource provider account and may replace the account identifier provided by the user in the token request message or the provisioning request message.

The universal account identifier may have a format that is different than a format of the account identifier provided by the user. In some embodiments, the format of the universal account identifier may be recognized and processed by universal transaction processing entities other than the resource provider that issued the resource provider account. The format of the universal account identifier may identify the resource provider that issued the resource provider account identified by the universal account identifier. The format of the universal account identifier may also identify the resource provider processor system 125 as the issuer of the universal account identifier. For example, the universal account identifier may start with (or end with, include at a predetermined location, etc.) a symbol or an alphanumerical character (e.g. an indicator) that is associated with the resource provider and/or the resource provider processor system 125. Accordingly, when the universal account identifier is analyzed and/or processed by a universal transaction processing entity, the universal transaction processing entity may identify the resource provider processor system 125 as the issuer of the universal account identifier.

According to various embodiments, the account identifier generation module 308 may generate additional information associated with the resource provider account. For example, the account identifier generation module 308 may generate a validation code, an expiration date, etc. associated with the resource provider account.

In some embodiments, upon generating the universal account identifier, the resource provider processor system 125 may send an account closure request to the resource provider computer via the external communication interface 310. The account closure request may inactivate the account identifier initially provided to the resource provider processor system 125 by the user.

Figure 4:
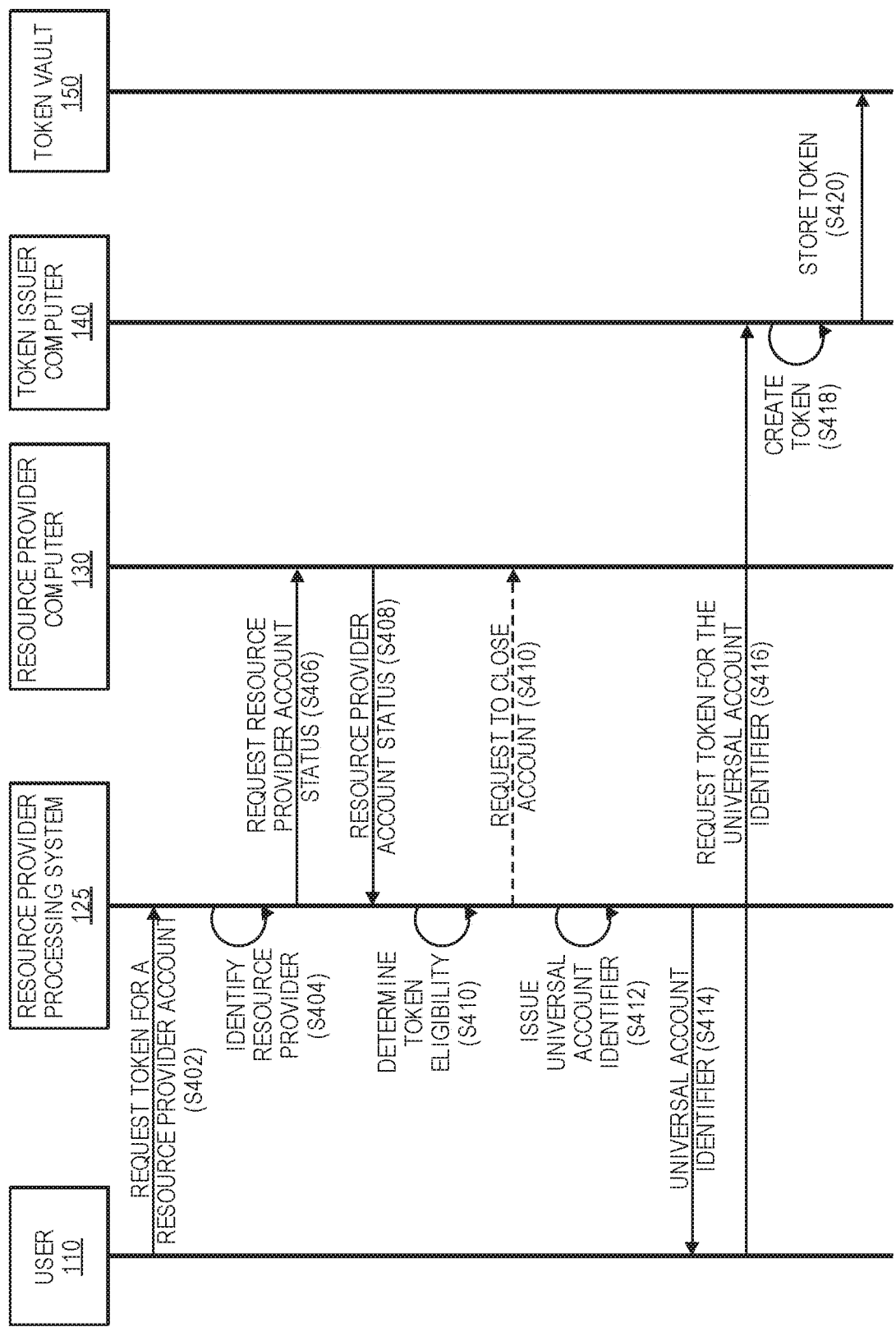
FIG. 4 illustrates a system and a flow diagram for generating a token associated with a resource provider account in accordance with some embodiments of the invention.
Figure 5:
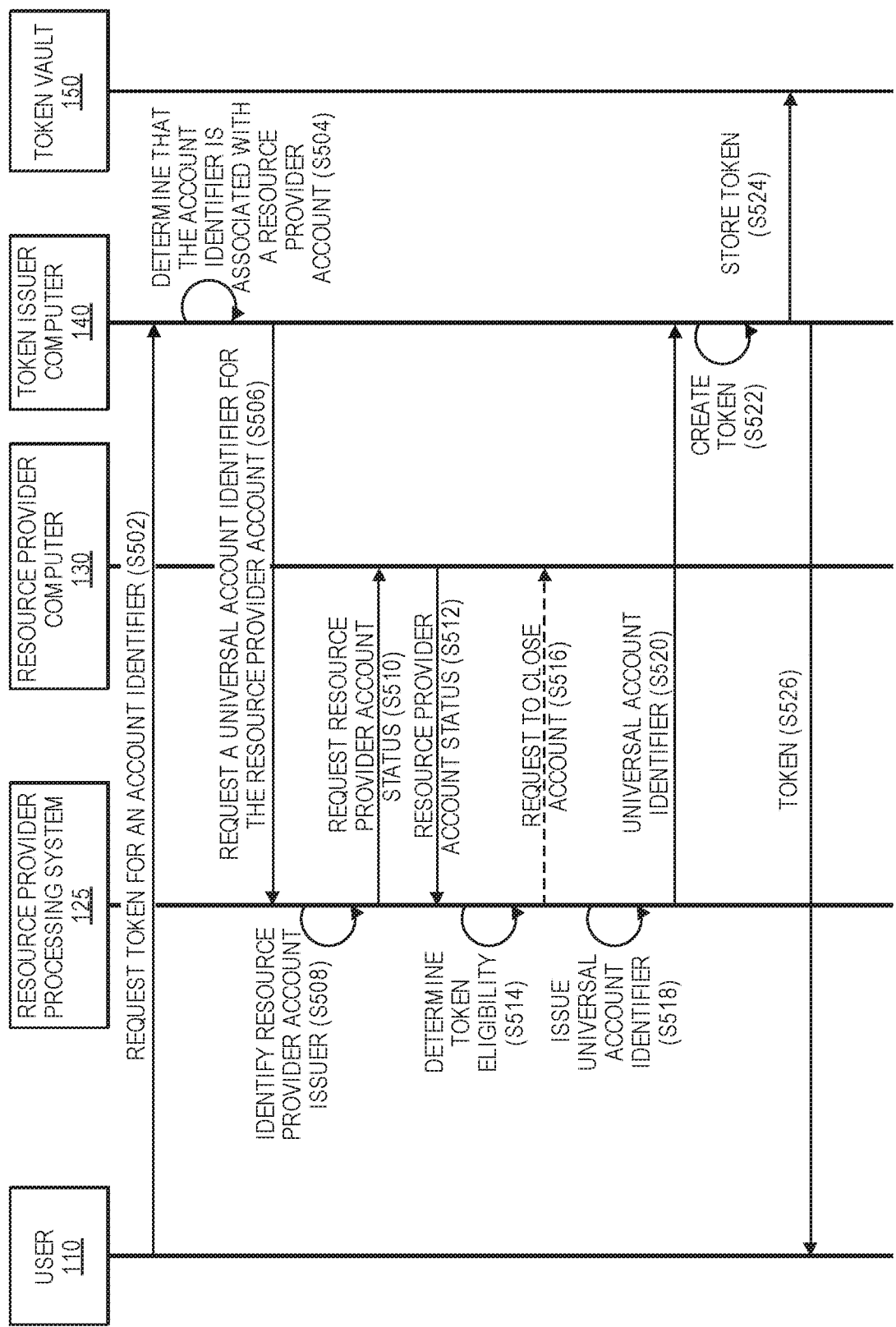
FIG. 5 illustrates another system and a flow diagram for generating a token associated with a resource provider account in accordance with some embodiments of the invention.

FIGS. 4 and 5 illustrate methods for generating a token associated with a resource provider account and returning the token to the user according to embodiments of the invention. The steps shown in any method herein may be performed sequentially or in any suitable order in embodiments of the invention. In some embodiments, one or more of the steps may be optional. The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

Referring now to FIG. 4, at S402, the user 110 may send a token request message or an account provisioning request message to the resource provider processing system 125 requesting a token for a resource provider account of the user 110. The token request message or the account provisioning request message may include an account identifier identifying the resource provider account of the user. The account identifier included in the request message may have a format.

At S404, the resource provider processing system 125 may analyze the account identifier and identify the resource provider that issued the resource provider account of the user. For example, the resource provider processing system 125 may identify the resource provider based on the format of the account identifier. In some embodiments, the account identifier may include an indicator identifying the resource provider that issued the resource provider account.

At S406, the resource provider processing system 125 may contact the resource provider computer 130 (e.g. a system of the identified resource provider) to request the status of the resource provider account. At S408, the resource provider processing system 125 may receive a response from the resource provider computer 130 regarding the status of the resource provider account.

At S410, the resource provider processing system 125 may determine whether the resource provider account eligible for token generation and/or provisioning on a user device based on the status of the resource provider account. For example, the resource provider account may be an account that stores value. If there is positive balance on the resource provider account, the account may be deemed to be active or to have favorable status (e.g. account is eligible for tokenization or for provisioning on a user device).

In some embodiments, at S410, the resource provider processing system 125 may request the resource provider computer 130 to close the resource provider account or deactivate the account identifier associated with the resource provider account when the resource provider account is deemed eligible for being provisioned on the user device.

At S412, the resource provider processing system 125 may generate a universal account identifier identifying the resource provider account. The universal account identifier may replace the account identifier provided to the resource provider processing system 125 by the user 110 at S402. The universal account identifier may be recognized and processed by universal transaction processing entities other than the resource provider who issued the resource provider account. The universal account identifier has a format, different from the format of the account identifier provided at S402, that is recognized by entities such as universal transaction processing entities or token issuing entities. The universal account identifier format may include a first indicator identifying the resource provider processing system 125 as the issuer of the universal account identifier. The universal account identifier format may also include a second indicator identifying the resource provider as the issuer of the resource provider account. For example, the universal account identifier may be a 16-digit PAN such as 4147 0900 0000 1234. The first four digits 4147 may identify a specific resource provider processor system 125 that issued this specific PAN. The next four digits 0900 may identify a specific source provider as the issuer of this PAN. This way, the universal transaction processing entity or token issuing entity may determine that the universal account identifier is associated with a resource provider account which would not be eligible for tokenization and/or provisioning without the universal account identifier.

At S414, the resource provider processing system 125 may send the universal account identifier to the user 110. The user 110 may request the resource provider account to be provisioned on their user device using the universal account identifier.

At S416, the user 110 may send a token request or a resource account provisioning request to a token issuer computer 140. The token issuer computer 140 may determine that the universal account identifier is associated with a resource provider account based on the format of the universal account identifier. However, since the format of the universal account identifier is recognizable (e.g. eligible for parsing) by the token issuer computer 140, the token issuer computer 140 may determine that a token can be generated for the universal account identifier.

At S418, the token issuer computer 140 may generate a token for the universal account identifier. At S420, the token issuer computer 140 may store the token and a mapping between the token and the universal account identifier at a token vault 150. At S422, the token issuer computer 140 may provide the token to the user 110. The token can be used to provision the resource provider account on the user device of the user 110.

In some embodiments, the resource provider processing system 125 may also receive, from the resource provider computer 130, restrictions associated with the resource account. In some embodiments, the restrictions may be applied by the user, the resource provider, the resource provider processor, the token issuer or the universal account processor system. For example, the resource account may be associated with access restrictions, spending restrictions, location-based restrictions, use-base restrictions, etc. The resource provider processing system 125 may provide (e.g. transmit) the restrictions associated with the resource provider account to the user 110 along with the universal account identifier. Such restrictions are passed (e.g. transmitted) to the token issuer computer 140 so that the generated token is associated with same or similar restrictions.

In some embodiments, at S414, instead of providing the universal account identifier to the user 110, the resource provider processing system 125 may send the universal account identifier directly to the token issuer computer 140 in a token request message. The token issuer computer 140 may generate the token and send it to the user 110 as described above in connection with S418-S422. In some embodiments, the token issuer computer 140 may send the token to the user via the resource provider processing system 125. Once the resource provider account is provisioned on the user device (e.g. on a digital wallet stored on the user device), the user 110 may conduct transactions with the resource provider account using the user device.

Referring now to FIG. 5, another method for generating a token associated with a resource provider account and returning the token to the user is described next. At S502, the user 110 may send a token request message or an account provisioning request message to the token issuer computer 140 requesting a token for a resource provider account of the user 110. The token request message or the account provisioning request message may include an account identifier identifying the resource provider account of the user. The account identifier included in the request message may have a format.

At S504, the token issuer computer 140 may analyze the account identifier and determine that the account identifier is associated with a resource provider account that is not eligible for token generation. In some embodiments, the token issuer computer 140 may determine that the account identifier is associated with a resource provider account based on the format of the account identifier.

At S506, the token issuer computer 140 may contact the resource provider processing system 125 and request a universal account identifier for the resource provider account associated with the account identifier received from the user 110 at S502. The universal account identifier request message sent from the token issuer computer 140 to the resource provider processing system 125 may include the account identifier provided to the token issuer computer 140 by the user 110 at S502.

At S508, the resource provider processing system 125 may analyze the account identifier and identify the resource provider that issued the resource provider account of the user. For example, the resource provider processing system 125 may identify the resource provider based on the format of the account identifier. In some embodiments, the account identifier may include an indicator identifying the resource provider that issued the resource provider account.

At S510, the resource provider processing system 125 may contact the resource provider computer 130 (e.g. a system of the identified resource provider) to request the status of the resource provider account. At S512, the resource provider processing system 125 may receive a response from the resource provider computer 130 regarding the status of the resource provider account.

At S514, the resource provider processing system 125 may determine whether the resource provider account eligible for token generation and/or provisioning on a user device based on the status of the resource provider account. For example, the resource provider account may be an account that stores value. If there is positive balance on the resource provider account, the account may be deemed to be active or to have favorable status (e.g. account is eligible for tokenization or for provisioning on a user device).

In some embodiments, at S516, the resource provider processing system 125 may request the resource provider computer 130 to close the resource provider account or deactivate the account identifier associated with the resource provider account when the resource provider account is deemed eligible for being provisioned on the user device. That is, once the account is deemed to be eligible for provisioning and a token is provisioned for that account, the actual account number can no longer be used because it is being replaced by the token.

At S518, the resource provider processing system 125 may generate a universal account identifier identifying the resource provider account. The universal account identifier may replace the account identifier provided to the resource provider processing system 125 by the token issuer computer 140 at S506. The universal account identifier may be recognized and processed by universal transaction processing entities other than the resource provider who issued the resource provider account. The universal account identifier has a format, different from the format of the account identifier provided to the resource provider processing system 125 at S506, that is recognized by entities such as universal transaction processing entities or token issuing entities. The universal account identifier format may include a first indicator identifying the resource provider processing system 125 as the issuer of the universal account identifier. The universal account identifier format may also include a second indicator identifying the resource provider as the issuer of the resource provider account. This way, the universal transaction processing entity or token issuing entity may determine that the universal account identifier is associated with a resource provider account which would not be eligible for tokenization and/or provisioning without the universal account identifier.

At S520, the resource provider processing system 125 may send the universal account identifier to the token issuer computer 140. At S522, the token issuer computer 140 may generate a token for the universal account identifier. At S524, the token issuer computer 140 may store the token and a mapping between the token and the universal account identifier at a token vault 150. At S526, the token issuer computer 140 may provide the token to the user 110. The token can be used to provision the resource provider account on the user device of the user 110. Once the resource provider account is provisioned on the user device (e.g. on a digital wallet stored on the user device), the user 110 may conduct transactions with the resource provider account using the user device.

In some embodiments, the resource provider processing system 125 may also receive, from the resource provider computer 130, restrictions associated with the resource account. In some embodiments, the restrictions may be applied by the user, the resource provider, the resource provider processor, the token issuer or the universal account processor system. For example, the resource account may be associated with access restrictions, spending restrictions, location-based restrictions, use-base restrictions, etc. In embodiments, where the user determines the restrictions, the user may select or create the restrictions (e.g. different spending restrictions) via a graphical user interface (GUI) on a user device (e.g. user computer, user mobile device, etc.). The resource provider processing system 125 may provide (e.g. transmit) the restrictions associated with the resource provider account to the token issuer computer 140 along with the universal account identifier. The token generated by the token issuer computer 140 is subject to (e.g. is associated with) the same or similar restrictions.

Embodiments of the invention have a number of advantages. For example, in embodiments of the invention, non-universal accounts, such as resource provider specific accounts, can be provisioned into user devices (e.g. into digital wallets) by creating a universal account identifier for a non-universal account. In connection with the provisioning, embodiments enable token generation for the non-universal accounts, such as resource provider specific accounts. Accordingly, users may not need to store or carry different identification proof for various non-universal accounts, and all account identifiers may be stored and/or provisioned on user's mobile device, for example on a digital wallet.

Embodiments further allow for the system to be replicated for many closed-loop systems. Specifically, systems 100 and 200 may be used in connection with any resource provider and/or resource provider processor.

Embodiments further allow a universal transaction processing entity to be able to process transactions initiated with resource provider accounts which are not traditionally eligible for processing by the universal transaction processing entity.

Figure 6:
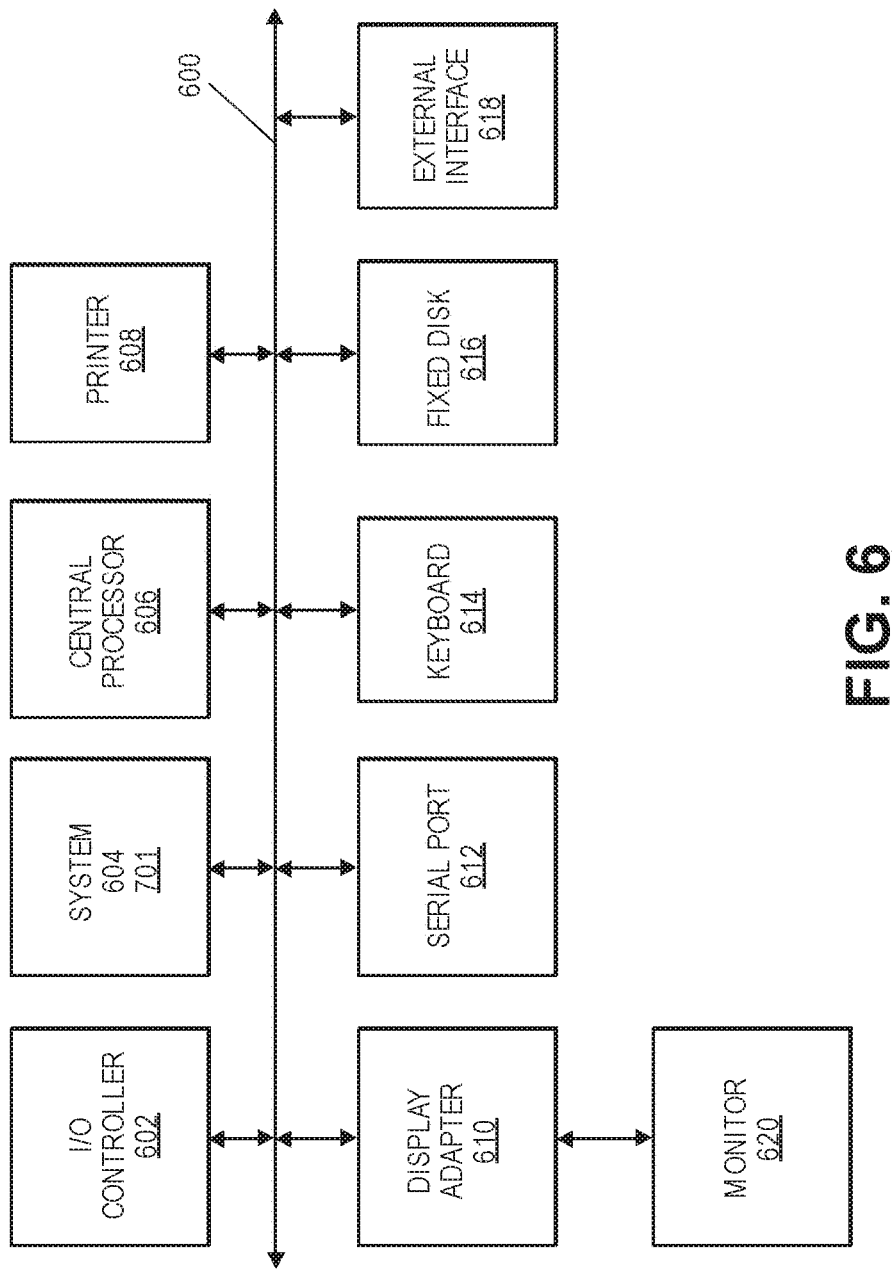
FIG. 6 shows an exemplary computer system according to embodiments of the present invention.

The various participants and elements shown in FIGS. 1-5 may operate one or more computer apparatuses (e.g., a server computer) to facilitate the functions described herein. Any of the elements in FIGS. 1-5 may use any suitable number of subsystems to facilitate the functions described herein. Examples of such subsystems or components are shown in FIG. 6. The subsystems such as a printer 608, keyboard 614, fixed disk 616 (or other memory comprising computer readable media), monitor 620, which is coupled to a display adapter 610, and others are shown. Peripherals and input/output (I/O) devices, which couple to I/O controller 602, can be connected to the computer system by any number of means known in the art, such as serial port 612. For example, serial port 612 or external interface 618 can be used to connect the computer apparatus to a wide area processing server computer, such as the Internet, a mouse input device, or a scanner. The interconnection via system bus 600 allows the central processor 606 to communicate with each subsystem and to control the execution of instructions from system memory 604 or the fixed disk 616, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, Objective C, C/C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or processing server computer.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
    receiving, by a token issuer server computer, a token request message including a first identifier from a token requestor;
    analyzing, by the token issuer server computer, the first identifier;
    determining, by the token issuer server computer and based on the analyzing, that (1) the first identifier is associated with a resource provider account that is exclusive to the resource provider, and (2) the first identifier is in a first format that is ineligible for tokenization and provisioning on a digital wallet of a user device;
    transmitting, by the token issuer server computer, a universal identifier request to a resource provider processor system, wherein the universal identifier request includes the first identifier and requests a universal identifier corresponding to the first identifier;
    receiving, by the token issuer server computer, the universal identifier corresponding to the first identifier from the resource provider processor system, wherein the universal identifier is in a second format that is eligible for tokenization and provisioning on the digital wallet of the user device, wherein the second format is attributed to the resource provider processor system such that the resource provider processing system is identifiable based at least on the second format;
    generating, by the token issuer server computer, a token for the universal identifier, wherein the token represents the universal identifier;
    storing, by the token issuer server computer, a mapping between the token and the universal identifier at a token vault; and
    transmitting, by the token issuer server computer, the token to the token requestor, wherein the token is provisioned on the digital wallet stored on the user device associated with an account holder of the resource provider account.

2. The method of claim 1, wherein the token issuer server computer includes an universal account processing server computer.

3. The method of claim 2, further comprising:
    receiving, at the universal account processing server computer, a transaction request including the token;
    retrieving, by the universal account processing server computer, the universal identifier represented by the token from the token vault;
    modifying, by the universal account processing server computer, the transaction request to include the universal identifier represented by the token;
    identifying the resource provider processing system based at least on the second format; and
    transmitting, by the universal account processing server computer, the modified transaction request including the universal identifier to the resource provider processor system for processing.

4. The method of claim 1, further comprising:
    receiving, by the token issuer server computer, one or more restrictions associated with the resource provider account; and
    storing the one or more restrictions along with the generated token at the token vault such that the generated token is subject to the one or more restrictions.

5. The method of claim 1, wherein a format of the first identifier included in the token request message is different than a format of the universal identifier generated by the resource provider processor system.

6. The method of claim 1, wherein the token requestor is the user device of a user.

7. The method of claim 6, wherein prior to receiving the universal identifier from the resource provider processor system, the resource provider processor system performs an identification and verification process with the user and validates that the user is an account holder of the resource provider account.

8. The method of claim 1, wherein the first identifier is deactivated upon issuance of the token or the universal identifier.

9. A token issuer server computer, comprising:
    one or more processors; and
    a non-transitory computer readable storage medium communicatively coupled with the one or more processors and storing instructions which, when executed by the one or more processors, cause the server computer to:
        receive a token request message including a first identifier from a token requestor;
        analyze the first identifier;
        determine, based on the analyzing, that (1) the first identifier is associated with a resource provider account that is exclusive to the resource provider, and (2) the first identifier is in a first format that is ineligible for tokenization and provisioning on a digital wallet of a user device;

transmit a universal identifier request to a resource provider processor system, wherein the universal identifier request includes the first identifier and requests a universal identifier corresponding to the first identifier;

receive the universal identifier corresponding to the first identifier from the resource provider processor system, wherein the universal identifier is in a second format that is eligible for tokenization and provisioning on the digital wallet of the user device, wherein the second format is attributed to the resource provider processor system such that the resource provider processing system is identifiable based at least on the second format;

generate a token for the universal identifier, wherein the token represents the universal identifier;

store a mapping between the token and the universal identifier at a token vault; and transmit the token to the token requestor, wherein the token is provisioned on the digital wallet stored on the user device associated with an account holder of the resource provider account.

10. The token issuer server computer of claim 9, wherein the token issuer server computer includes a universal account processing server computer and wherein the non-transitory computer readable storage medium stores instructions which, when executed by the one or more processors, cause the server computer to:

receive a transaction authorization request including the token;

retrieve the universal identifier represented by the token from the token vault;

modify the transaction authorization request to include the universal identifier represented by the token;

identify the resource provider processing system based at least on the second format; and transmit the modified transaction authorization request including the universal identifier to the resource provider processor system for processing.

11. The token issuer server computer of claim 9, further storing instructions which, when executed by the one or more processors, cause the server computer to:

receive one or more restrictions associated with the resource provider account; and store the one or more restrictions along with the generated token at the token vault such that the generated token is subject to the one or more restrictions.

12. The token issuer server computer of claim 9, wherein the token requestor is the user device of a user.

13. The token issuer server computer of claim 12, wherein prior to receiving the universal identifier from the resource provider processing system, the resource provider processing system performs an identification and verification process with the user and validates that the user is an account holder of the resource provider account.

14. The token issuer server computer of claim 9, wherein the first identifier is deactivated upon issuance of the token or the universal identifier.

* * * * *